Jan 6, 1931.  S. T. SWANBERG  1,787,601

DOUBLE ACTION NOISELESS FLOAT VALVE

Filed Nov. 12, 1927

Inventor
Swan T. Swanberg.
By A. J. O'Brien
Attorney

Patented Jan. 6, 1931

1,787,601

UNITED STATES PATENT OFFICE

SWAN T. SWANBERG, OF DENVER, COLORADO

DOUBLE-ACTION NOISELESS FLOAT VALVE

Application filed November 12, 1927. Serial No. 232,826.

This invention relates to improvements in float valves of the type employed in connection with toilet fixtures and has reference more particularly to a noiseless float valve.

It is well known that the ordinary float valves now extensively employed in connection with toilet fixtures are noisy when closing and for this reason they are highly objectionable.

It is the object of this invention to produce a float valve that shall be noiseless in its operation and which shall be of simple and substantial construction that can be cheaply made and easily installed and which will have very few and simple parts.

Figure 1:
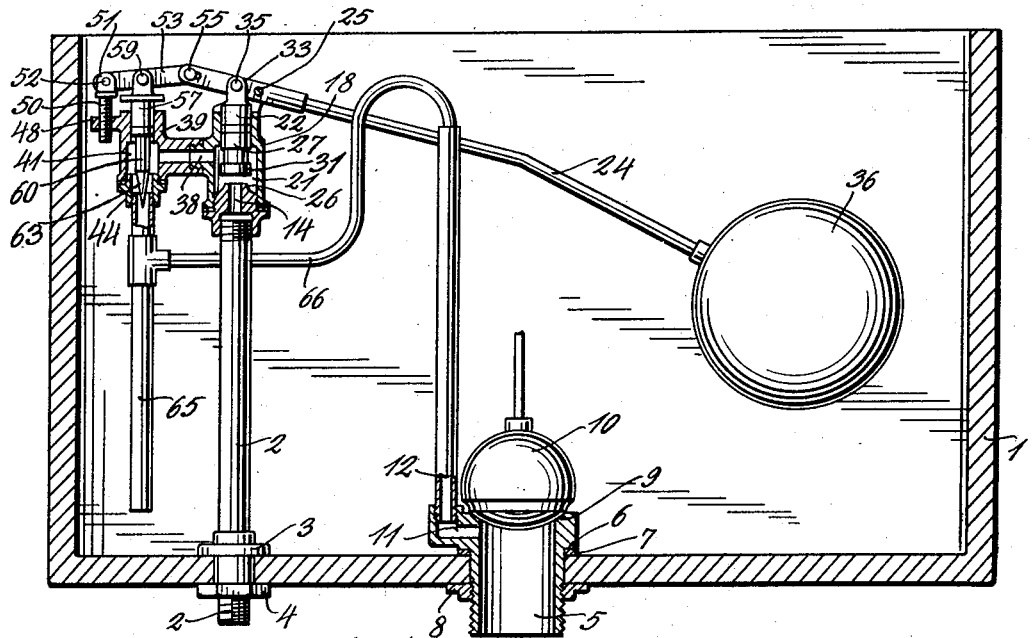
Figure 2:
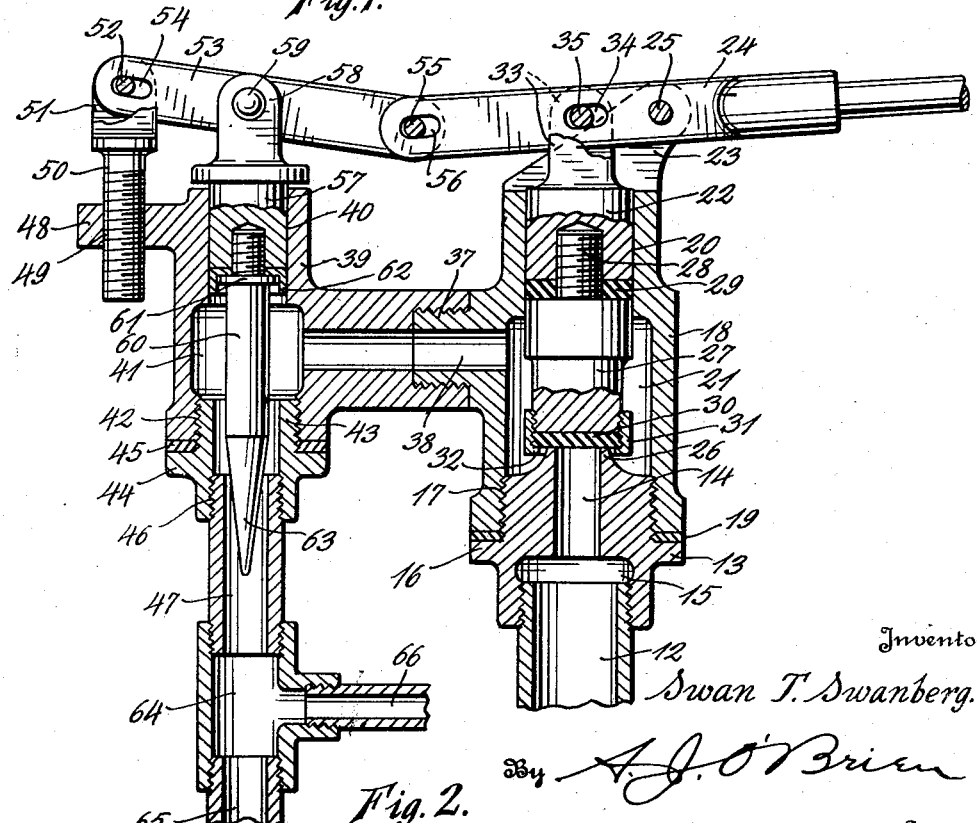

In order to describe this invention so that its construction and operation can be readily understood, reference will be had to the accompanying drawing in which the preferred embodiment thereof has been illustrated, and in which:

Fig. 1 is a vertical longitudinal section through a tank showing the same equipped with my noiseless float valve which has been shown in section; and Fig. 2 is a sectional view of my improved float valve showing the same on a larger scale than that employed in Fig. 1.

Numeral 1 designates a flush tank of the ordinary construction which, in this case, has been shown as of cast iron but it may be of porcelain and numeral 2 designates the supply pipe which is connected to the water supply and extends through the bottom of the tank. This pipe is secured to the tank by means of a flange 3 and a locknut 4 in the usual manner. A coupling member 5 is secured to the bottom of the tank and extends through a hole therein in the manner shown in Fig. 1. This member has a flange 6 which is separated from the inner surface of the bottom by means of a washer 7 and is held in place by a nut 8. The upper end of this connector has a valve seat 9 with which the rubber ball 10 cooperates, all in the manner old and well known. Member 5 is also provided with an auxiliary opening 11 which terminates in an upwardly extending portion which is threaded for the reception of the threaded end of pipe 12. This opening communicates with the interior of member 5 below the valve seat 9.

My improved valve consists of a part which has been designated by reference numeral 13 and which is provided with two axial openings 14 and 15 of different diameters. Opening 15 is threaded for the reception of the threaded end of pipe 2. A flange 16 extends outwardly from member 13 and the cylindrical portion 17 which lies above this flange is threaded for the reception of the tubular body member 18. When parts 13 and 18 are assembled, they are separated by a washer 19 which serves to make a water tight joint. Member 18 has an axial opening comprising two sections 20 and 21 of different diameters. The inner surface of section 20 is reamed so as to form a smooth cylindrical surface with which the plunger valve 22 cooperates. Projecting upwardly at the top of member 18 are two lugs or ears 23, between which the lever 24 is moved and to which it is pivotally attached by means of a pin 25. The upper end of member 13 terminates in a valve seat 26 which surrounds the opening 14. The plunger valve, of which part 22 forms a portion, comprises also another cylindrical member 27 which is provided at one end with a threaded stem 28, that engages in a suitable threaded opening in the lower end of member 22. A washer 29 of leather or other suitable material, is located between the lower end of part 22 and the upper end of part 27 and serves as a gasket to prevent the leakage at this point. Attached to the lower end of member 27 is a disk 30, which is preferably made of soft rubber and which is held in place by means of a threaded collar 31, whose inwardly extending flange 32 overlaps the outer edge of this disk and holds the same in place. The upper end of member 22 terminates in two spaced lugs 33 between which the flat portion of lever 24 extends. This lever has an elongated opening 34, through which a pivot pin 35 extends. The ends of this pivot pin pass through openings in the lugs 33 so that when lever 24 is oscillated about its pivot 25, the plunger valve will be raised and lowered in the manner indicated in the drawings. A ball float 36 is attached to the free end of lever 24 and rests upon the water within the tank in the usual manner. When the float is in its uppermost position, the parts will assume the position shown in Fig. 2 and the rubber disk 30 will then be pressed against the valve seat 26 with sufficient force to prevent the water from entering. When the water level in the tank is low, the parts will assume the position shown in Fig. 1 in which position the valve is open and permits water to flow into the opening 21. Projecting from one side of the tubular body member 18 is a cylindrical plug 37 whose outer surface is threaded. This plug is provided with an axial opening 38 that communicates with the interior of chamber 21. In the construction shown the valve has been formed of two major portions, one of which has been designated by numeral 18 and the other of which will be designated by numeral 39. The tubular body portion 39 is similar to 18 and has a cylindrical opening 40 whose inner surface has been reamed so as to make it smooth and is also provided with a central chamber 41, whose lower end terminates in a threaded section 42. Threadedly connected with the section 42 is a coupling member 43, which is provided intermediate its ends with an outwardly extending flange 44 that is separated from the lower end of body member 39, by means of a washer 45. The coupling member 42 is provided with an axial opening whose lower end is threaded at 46 to receive the upper threaded end of the pipe 47. Extending outwardly from the body member 39, near the upper end thereof, is a lug 48 which is provided with a threaded opening 49 to which the plug 50 is attached. The upper end of plug 50 is provided with two spaced arms 51, which are perforated for the reception of the pivot pin 52. Lever 53 is provided at one end with an elongated opening 54, through which the pivot pin 52 extends. The other end of this lever carries a pivot pin 55, which projects through an elongated slot 56 in lever 24 all in the manner quite clearly shown in Fig. 2. Located within the cylindrical opening 40, is a plunger 57 from the upper end of which project two spaced lugs 58 between which the lever 53 is located and to which it is attached by means of a pivot pin 59. Secured to the lower end of plunger 57 is a cylindrical outlet restricting member 60. This member has a circular flange 61 that is adapted to engage the bottom of the cup leather 62 and hold the same in place in the manner illustrated. The lower end of member 60 is tapered in the manner indicated by numeral 63. This tapered end projects into the upper end of pipe 47. The location and size of the tapered section is such that even when the parts are in the position shown in Fig. 2, it will not entirely close the opening in the upper end of pipe 47 and when the float 36 moves downwardly, this tapered portion can be withdrawn from the pipe so as to increase the effective area through which the water may flow. Secured to the lower end of pipe 47 is a T 64. A pipe 65 extends from the T to a point adjacent the bottom of the tank. A pipe 66 is connected to the lateral opening in this T and extends from the T into the upper end of pipe 12 in the manner shown in Fig. 1. Pipes 66 and 21 are sections of the refill pipe that serves to conduct water to the bowl of the fixture after the valve 10 has seated.

Let us now assume that the parts are in the position shown in Fig. 1 and that pipe 2 is connected to the water supply which is under pressure. Water will now flow upwardly through pipe 2, through the cylindrical opening 14 and between the upper edge of the valve seat 26 and the rubber disk 30 and enter the chamber 21. From here it will pass through opening 38 into the chamber 41 in the cylindrical body member 39 and from this chamber it will flow downwardly through the annular space between the conical portion 63 and the interior of pipe 47 and enter the tank through pipe 65. As the level of the water rises in the tank, it soon engages the lower portion of the float 36 and submerges the same to some extent, and as the water rises about this float the buoyancy effect tends to rotate the lever 24 in a counter clockwise direction and this in turn moves the plunger valve 22 and member 57 downwardly. When the valve that controls the admission of water from pipe 2 is in full open position, the area of this valve opening is larger than the area of the annular opening between the conical member 63 and the upper end of pipe 47 with the result that the water within chambers 21 and 41 will be under considerable pressure due to the fact that the area of the outlet opening is smaller than the area of the inlet opening. This pressure within chambers 21 and 41 acts on the plunger valve 22 and member 57 to move them upwardly against the force exerted by float. The float, however, is so proportioned that it will produce sufficient force to close the valve against the force produced by the water. As the inlet valve continues to close, the area of this inlet opening will soon arrive at a value which is smaller than the area of the outlet member and when this point is reached, the pressure of the water within chambers 21 and 41 will fall, due to the fact that the water can leave faster than it can enter. When this point has been reached, therefore, there is a sudden decrease of the resistance against which the float 36 is operating and, therefore, since this float has been submerged so as to produce the necessary force to overcome this larger resistance, as soon as this resistance is decreased, the float will immediately rise and this will further decrease the area of the inlet with the result that the float can more easily overcome the resistance and the inlet valve will therefore quickly close with the result that instead of gradually closing the inlet valve in the manner now common in apparatus of this kind, the inlet will be closed suddenly and therefore the usual noise which is due to the flow of water through a very restricted opening during the later stages of the closure of the valve, will be eliminated. There is also another reason why this valve operates noiselessly and that is that during the greater portion of the valve operation, the inlet opening is open so as to let water into the interior of the valve quicker than it can leave and as the intake valve is located in a space which contains water under substantially the same pressure as that which prevails in the interior of pipe 2, there is no tendency to produce a noisy operation. As above explained the device is so constructed that as soon as the area of the inlet opening decreases to a point below that of the outlet opening, the float will act almost instantaneously and quickly close the inlet valve and therefore there will be no opportunity for a noisy operation after the pressure within the valve has decreased.

From the above it will be apparent that I have produced a valve of a novel construction in which there are two openings connected in series between the water supply and the interior of the tank and that the area of the inlet valve opening increases and decreases at a faster rate than the area of the outlet opening so that during the opening and the closing movement of the inlet valve, the area of the inlet opening will vary from a value below to a value above that of the area of the outlet opening and from greater value to a smaller value in the manner explained. The outlet opening restricting means is so constructed that it never entirely closes the opening into pipe 47.

Having described the invention what I claim as new is:

1. A flush valve mechanism comprising a hollow body member having an inlet opening and an outlet opening, a movable valve member for varying the area of the inlet opening from maximum to zero, a device for varying the area of the outlet opening from maximum to a minimum value which is greater than zero and means for simultaneously moving the valve member and the outlet varying device, the area of the inlet opening being increased and decreased faster than the area of the outlet opening.

2. A float operated valve for controlling the flow of water from a source containing water under pressure to a container, comprising, in combination, a hollow body member having an inlet opening connected with a pipe for supplying water under pressure and an outlet opening communicating with a container, a float operated valve adjacent the end connected with the supply pipe for controlling the entrance of water into the member, and an area reducing device for controlling the area of the outlet opening, means for interconnecting the valve and area reducing device and for maintaining the outlet opening constantly open.

3. A mechanism for controlling the flow of water from a source containing water under pressure to a container, comprising, in combination, a valve member having an opening extending therethrough, one end of the opening being connected with the water supply and the other end being in communication with the container, a float controlled valve adjacent the inlet opening for controlling the flow of water into the valve member, a device associated with the outlet opening from the valve member for varying the area thereof, and means for interconnecting the valve and the outlet area varying device and for maintaining the outlet opening constantly open.

4. A mechanism for controlling the flow of water from a source containing water under pressure to a container, comprising, in combination, a valve member having a passage through which the water may flow, one end of the passage being connected with the water supply and the other end being in communication with the container, a valve mechanism for controlling the entrance of water into the passage in the valve member, a device for varying the area of the outlet from the passage from a partly open to a fully open value and means for interconnecting the valve and the outlet area varying device so that they will operate to simultaneously increase the areas of the inlet and outlet openings.

In testimony whereof I affix my signature.

SWAN T. SWANBERG.